Patented May 31, 1938

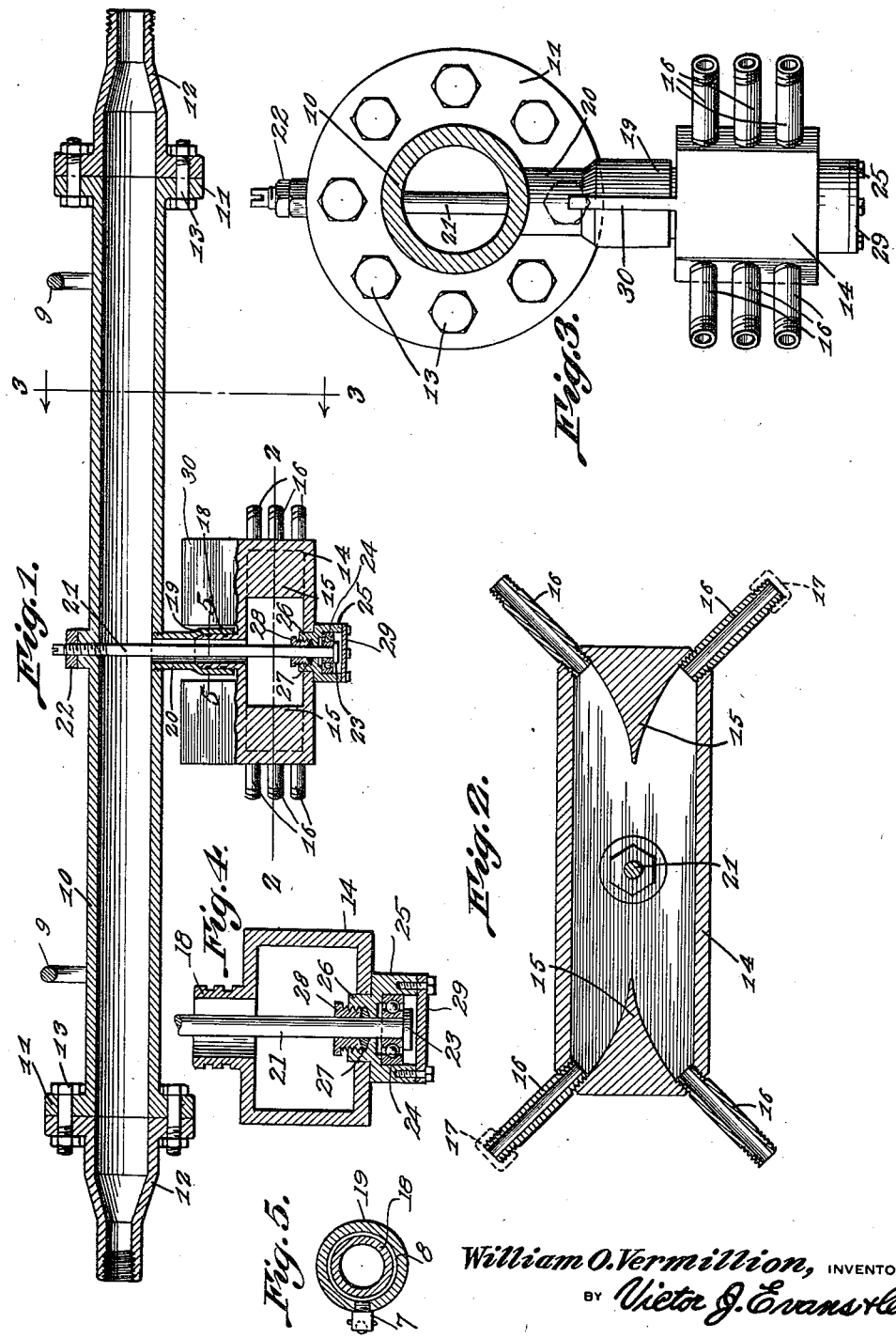

2,118,908

UNITED STATES PATENT OFFICE 2,118,908

MUD MIXER AND EQUALIZER

William O. Vermillion, Hobbs, N. Mex., assignor, by direct and mesne assignments, of twenty per cent to James E. Vermillion, ten per cent to W. L. Wilson, seventeen and one-half per cent to Wiley Leo Conner, seven and one-half percent to C. B. Cochran, and two and one-half per cent to Herman C. Coppedge, all of Hobbs, N. Mex., and five per cent to Charles I. Vermillion, Lovelady, Tex.

Application August 1, 1936, Serial No. 93,915

1 Claim. (Cl. 259—96)

This invention relates to mud mixers and equalizers for rotary oil well drilling.

Hitherto it has been the practice to mix the mud used in conection with the drilling of oil wells by simply pumping the mud from a pit and returning the mud to the pit by means of a gun. The gun delivers the mud to the pit above the surface of the mud in the pit so that obviously a great deal of air is mixed with the mud and bubbles form in the mud. This is highly objectionable because the mud is thinned out to a harmful degree and causes injury to property and loss of life through blowouts. Mud is used as is well known to hold gas pressure in the well and when mud containing air bubbles is used it gradually becomes thinner and thinner so that eventually its effectiveness as a seal is wholly destroyed.

With the above disadvantages in mind, the present invention has for its principal object to pump the mud from below the mud level in the pit and return it to a submerged point in the pit so that a closed cycle will be effected during which no contact of the mud with the atmosphere can take place and consequently the disadvantageous entry of atmospheric air into the mud during the mixing will be positively prevented and the resultant product will be homogeneous throughout.

A further object of the invention is to provide mixing apparatus which will be submerged in the mud pit below the mud level and may be readily raised and lowered in the mud so that the entire mass of mud from the surface to the bottom will be thoroughly agitated and mixed and at the same time freed of all entrapped air and thus will gradually increase in weight until a predetermined weight per gallon has been reached which weight is usually determined by the driller to suit various drilling conditions.

A further object is to provide apparatus of this type which will not only mix and equalize the mud but will also heat the mud, this being accomplished by supplying steam to the mud being pumped from and returned to the pit. In practice heating the mud is beneficial in that the weight of the mud is more quickly increased to the predetermined pounds per gallon than where no heating operation is performed during the mixing of the mud.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification.

Figure 1 is a longitudinal sectional view through mud mixing and equalizing apparatus constructed in accordance with the invention.

Figure 2 is an enlarged cross sectional view taken on the line 2—2 of Figure 1 showing the spinner box and jet pipes.

Figure 3 is an enlarged cross sectional view taken on the line 3—3 of Figure 1 showing the manifold and spinner box carried thereby.

Figure 4 is an enlarged cross sectional view of the lower bearing which rotatably supports the spinner box on its shaft.

Figure 5 is a detail cross sectional view taken on the line 5—5 of Figure 1 and showing the grease connection for lubricating upper bearing of the spinner box.

Referring now to the drawing in which like characters of reference designate similar parts in the various views, 10 designates a manifold having flanged ends 11 to which reduced flanged coupling nipples are attached. Any number of these manifolds may be secured together to form a continuous manifold. The manifold is connected at both ends to the bleeder line of the pump used to pump mud from the mud pit and in practice the manifold is submerged below the mud level in the pit. The manifold is provided with integral eyes 9 to which a tackle may be secured for raising and lowering the manifold in the pit and moving the manifold to any desired location in the pit.

The manifold is equipped with a spinner box 14 which is substantially oblong in contour although it may be of any desired contour. The spinner box is provided interiorly at the ends with substantially triangular deflectors 15 for the purpose of deflecting the mud stream from the pump toward the corners of the box. Jet pipes 16 enter the box at the corners and are inclined at an angle of about 45° to the longitudinal median line of the box. By selectively capping one pair of the diagonally opposite jet pipes as shown at 17 the spinner box may be caused to rotate in one direction and by capping the other pair of diagonally opposite jet pipes the spinner box may be caused to rotate in the opposite direction.

The spinner box is equipped with a bearing nipple 18 on the top which is rotatably mounted in the enlarged end 19 of a pipe 20 which is threaded into the manifold 10. Grease grooves 8 are formed circumferentially in the nipple 18 and the enlarged end 19 is equipped with a grease connection 7 to which grease may be supplied to lubricate the bearing surface of the nipple 18 and enlarged end 19.

A shaft 21 is secured to the manifold 10 and forms an axis of rotation for the spinner box 14. The shaft passes through the pipe 20 and through the nipple 19 and is screw threaded at the upper end to be received in an internally screw threaded boss. A lock nut 22 is threaded upon the shaft and jammed against the boss to hold the shaft rigidly connected to the manifold at the upper end.

The lower end of the shaft passes downwardly through the bottom of the spinner boss and is equipped below the spinner box with a collar 23 upon which is supported a ball bearing 24. The ball bearing is fitted in a casing 25 which is provided with a nipple 26 that is screw threaded into the bottom of the spinner box and is provided with a packing 27 which is compressed by a nut 28 to prevent entry of mud into the bearing. A cap 29 is bolted onto the bottom of the casing 25 to seal the casing mud tight.

The weight of the spinner box is supported upon the collar 23 and the thrust is taken up by the ball bearing 24. Vanes 30 rise from the top of the spinner box on opposite sides of the nipple 18. These vanes agitate the mud as the spinner box rotates. This agitation is augmented by the jets of mud forced from the jet pipes 16 at opposite corners of the spinner box so that the mud is thoroughly agitated, mixed and equalized throughout a large area around the spinner box. Any entrapped air in the mud is thus thoroughly worked out of the mud so that weight of the mud is quickly increased to a predetermined weight per gallon.

Steam under pressure may be let into the manifold 10 along with the mud stream from the pump to heat the mud and thus more quickly increase the weight of the mud since it is well known that by heating mud a more solid homogeneous mass may be quickly obtained than where heat is not used.

In operation the manifold and spinner box are maintained at all times submerged below the surface of the mud. This is of importance since hitherto no way has been found to increase the weight of mud and free the same of all entrapped gases without at the same time working atmospheric air into the mud. While submerged below the surface of the mud the apparatus may be raised and lowered so that the mud which is caked on the bottom of the pit may be reached and broken up and mixed thoroughly through the entire mass of mud in the pit. Thus the benefit of this bottom mud is obtained where hitherto the mud on the bottom of the pit has been wasted.

It will also be pointed out that not only is this device useful for preparing mud for rotary oil well drilling but it may also be used for forming an emulsion of bottom sediment in oil storage tanks thereby eliminating the expensive hand cleaning method now in use.

The device may also be used wherever a bottom sediment exists such as in the manufacture of paint and other commodities.

From the above description it is thought that the construction and operation of the invention will be fully understood without further explanation.

What is claimed is:

Apparatus for mixing and equalizing a mud bath for rotary oil well drilling comprising, a substantially horizontally disposed pipe forming a manifold adapted to be submerged below the mud level in a mud pit, spaced eyes disposed on the top side of the pipe near the ends thereof for receiving means to continuously raise and lower the pipe bodily during the mixing operation, a shaft rotatably mounted in the manifold between the eyes thereof and projecting vertically downward below the pipe, there being a connection between the manifold and the bleeder line of a pump, an elongated substantially rectangular spinner box rotatably mounted on said shaft and extending substantially parallel with the manifold adjacent to and below the manifold, jet pipes projecting from the corners of the box and diverging outwardly from each other, substantially triangular shaped deflectors in the box adjacent to the jet pipes for starting the mud in the box toward the jet pipes and forming abutments against which back pressure in the box impinges to increase velocity of rotation of the box, vanes on the top of the box on opposite sides of the shaft forming agitators, and a hollow bearing disposed concentrically with respect to the shaft connected to the box and to the manifold, the connection of the bearing with the box being such as to permit the box to rotate on the bearing, said bearing forming a mud passageway from the manifold to the box, mud passing from the manifold along said deflectors toward and out of the jet pipes and thereby rotating the box on said shaft as an axis.

WILLIAM O. VERMILLION.